United States Patent [19]

Yokote

[11] Patent Number: 5,427,407
[45] Date of Patent: Jun. 27, 1995

[54] AIR BAG SYSTEM

[75] Inventor: Yoshihiro Yokote, Kanagawa, Japan

[73] Assignee: NSK Ltd., Tokyo, Japan

[21] Appl. No.: 312,190

[22] Filed: Sep. 26, 1994

[30] Foreign Application Priority Data

Sep. 27, 1993 [JP] Japan .................... 5-052106 U

[51] Int. Cl.⁶ .......................................... B60R 21/16
[52] U.S. Cl. .................................................. 280/728.2
[58] Field of Search .......... 280/728 R, 728 A, 728 B, 280/731, 732

[56] References Cited

U.S. PATENT DOCUMENTS

| 4,989,897 | 2/1991 | Takada | 280/743 |
| 5,002,307 | 3/1991 | Heidorn | 280/731 |
| 5,167,427 | 12/1992 | Baba | 280/743 |
| 5,249,824 | 10/1993 | Swann et al. | 280/729 |
| 5,284,359 | 2/1994 | Baba | 280/743 R |
| 5,297,813 | 3/1994 | Baba et al. | 280/728 R |
| 5,312,129 | 5/1994 | Ogawa | 280/728 A |

FOREIGN PATENT DOCUMENTS

| 455147 | 2/1992 | Japan . |
| 454747 | 5/1992 | Japan . |
| 4115968 | 10/1992 | Japan . |
| 512306 | 2/1993 | Japan . |
| 5131886 | 5/1993 | Japan . |
| 5162601 | 6/1993 | Japan . |

Primary Examiner—Margaret A. Focarino
Assistant Examiner—Paul N. Dickson
Attorney, Agent, or Firm—Evenson, McKeown, Edwards & Lenahan

[57] ABSTRACT

An air bag system comprises a housing, an inflator, an air bag, a cover, and connecting and fixing members. The inflator is supported on the housing and upon occurrence of a collision accident, blows out high-pressure gas. The air bag is supported in a folded form on the housing and in the event of the collision accident, is inflated by the high-pressure gas. The cover extends over the folded air and has convex portions formed on an inner wall thereof by inwardly thickening portions of the cover. The housing has engaged portions formed on an outer wall thereof and adapted to cooperate with the convex portions, each of the engaged portions being maintained in engagement with a respective one of the convex portions when the cover is connected to the housing. The connecting and fixing members extend through the respective convex portions and the engaged portions with the engaged portions maintained in engagement with the corresponding convex portions.

9 Claims, 7 Drawing Sheets

AIR BAG SYSTEM

BACKGROUND OF THE INVENTION a) Field of the Invention

This invention relates to an air bag system, which is used in a state mounted in a central part of a steering wheel or in an instrument panel to protect a driver or an occupant in a front passenger's seat in the event of a collision accident.

b) Description of the Related Art

In the event of a collision accident, the so-called primary collision that an automotive vehicle collides with another automotive vehicle or the like is followed by occurrence of the so-called secondary collision that an occupant such as the driver hits the steering wheel. With a view to reducing an impact exerted on the occupant's body at the time of the secondary collision and hence protecting the occupant, air bag systems are finding increasing utility.

An air bag system promptly inflates a bag in the event of a collision accident and supports the body of an occupant by the inflated bag. Known air bag systems include, for example, those disclosed in Japanese Patent Applications Laid-Open Nos. HEI 1-109146, 4-27639, 4-55147, 5-131886 and 5-162601 and Japanese Utility Model Applications Laid-Open Nos. HEI 4-54747, 4-115968 and 5-12306. FIG. 12 of the accompanying drawings shows an air bag system whose basic structure is disclosed in Japanese Patent Application Laid-Open No. HEI 1-109146.

An air bag module 1, which constitutes the air bag system, is constructed of a housing 2 fixed on an unillustrated steering wheel (in the case of an air bag system for a driver's seat), an inflator 3 for blowing out high-pressure gas such as nitrogen gas upon occurrence of a collision accident, said inflator 3 being supported and fixed in a central part of the housing, an air bag 4 for being inflated by the high-pressure gas in the event of the collision accident, said air bag 4 being supported in a folded form on the housing 2, and a cover 5 normally extending over the air bag 4.

Of these elements, the air bag 4 defines an opening 7 having an inner diameter which is large enough to permit insertion of a gas blow-out portion 6 of the inflator 3. Around the gas blow-out portion 6 of the inflator 3, a peripheral edge portion of the opening 7 lies on the housing 2 and is held between the housing 2 and an annular holding plate 8. By bolts 9 and nuts 10, the holding plate 8 is fixed on the housing 2.

The cover 5 has been formed by injection molding a synthetic resin or the like and has a cover plate portion 11 extending over the air bag 4 and a mounting plate portion 12 disposed on one side of the cover plate portion 11. The housing 2, on the other hand, has been formed by drawing a metal plate and has a base plate portion 13 for supporting the inflator 3 and the air bag 4 thereon and a support plate portion 14 formed on a peripheral edge portion of the base plate portion 13 to connect and fix the mounting plate portion 12.

To connect and fix the cover 5 to and on the housing 2, the mounting plate portion 12 is held between an outer side wall of the support plate portion 14 and a holding strip 15. These three superposed members 12,14,15 are connected together by blind rivets 18 or by connecting members such as bolts and nuts. A flange portion 16 is formed on and along an end edge of the mounting plate portion 12. End edges of the flange portion 16 are maintained in engagement with proximal end edges of the support plate portion 14 and the holding strip 15, respectively, so that the mounting plate portion 12 is prevented from slipping down between the support plate portion 14 and the holding strip 15.

Upon occurrence of a collision accident, the inflator 3 blows out high-pressure gas responsive to a signal from an unillustrated impact detection sensor so that the air bag 4 is promptly inflated. At this time, the cover 5 is torn at a thin wall portion 17, thereby allowing the air bag 4 to pop out of the cover 5. As a result, the air bag 4 is allowed to inflate on a rear side of the steering wheel and supports the driver's body.

In the air bag system which is constructed and operable as described above, the structure of a portion where the mounting plate portion 12 of the cover 5 is connected to and fixed on the support plate portion 14 of the housing is preferred to meet the following conditions (1) to (3):

(1) Inclusion of positioning means for limiting the positional relationship between the support plate portion 14 and the mounting plate portion 12.

The support plate portion 14 and the mounting plate portion 12 are connected and fixed together by registering circular holes, which are formed in both the plate portions 14,12, with each other and inserting connecting members such as bolts and nuts or rivets in the circular holes. Without the positioning means described above, it is not easy to have the circular holes registered with each other as described above, thereby making the assembly work of the air bag system cumbersome.

(2) Inclusion of displacement-preventing means between the support plate portion 14 and the mounting plate portion so that both the plate portions 14,12 are prevented by the displacement-preventing means itself from displacement in the direction of planes in which the plate portions lie, respectively.

In the construction shown in FIG. 12, for example, the mounting plate portion 12 of the cover 5 is strongly pulled upwards as viewed in FIG. 12 upon actuation of the air bag system (i.e., upon inflation of the air bag 4 based on blow-out of high-pressure gas from the inflator 3). To ensure actuation of the air bag system, the connection between both the plate portions 14 and 12 themselves must be surely prevented from separation by the pulling force.

Unless the displacement-preventing means is present, it becomes necessary to increase the connecting force for both the plate portions 14,12 by using more connecting members. Use of more connecting members undesirously leads to the need for more assembling steps.

(3) Need for fewer parts for the connecting and fixing portion between the support plate portion 14 and the mounting plate portion 12.

If many parts are needed, the fabrication, management and assembly of the parts becomes cumbersome. The need for such many parts is therefore not preferred.

The construction shown in FIG. 12, that is, disclosed in Japanese Patent Application Laid-Open (Kokai) NO. HEI 1-109146 can meet the conditions (1) and (2) out of the above-described conditions (1) to (3) but cannot meet the condition (3). Namely, the holding strip 15 is indispensable to surely keep the flange portion 16, which is formed on the mounting plate portion 12, in engagement with the end edge of the support plate portion 14 so that the connecting strength between the support plate portion 14 and the mounting plate portion 12 can be retained.

If this holding strip 15 is omitted, the engagement between the flange portion 16 and the end edge of the support plate portion 14 becomes insecure so that upon actuation of the air bag system, a large force may be applied to the mounting plate portion 12 at areas where the blind rivets 18 have been inserted.

SUMMARY OF THE INVENTION

The above-described patent and utility model publications also disclose constructions in which the support plate portion 14 and the mounting plate portion 12 are connected and fixed by various structures. None of these constructions, however, can meet all the conditions (1) to (3). With these circumstances in view, the present invention has been completed to meet the conditions (1) to (3).

In one aspect of the present invention, there is thus provided an air bag system comprising:

a housing;

an inflator for blowing out high-pressure gas upon occurrence of a collision accident, said inflator being supported on the housing;

an air bag for being inflated by the high-pressure gas in the event of the collision accident, said air bag being supported in a folded form on the housing;

a cover extending over the air bag which is in the folded form; and means for connecting and fixing the cover to the housing, said connecting and fixing means having convex portions formed on an inner wall of the cover by inwardly thickening portions of the cover, engaged portions formed on an outer wall of the housing and maintained in engagement with the respective convex portions, and connecting members extending through the respective convex portions with the engaged portions maintained in engagement with the corresponding convex portions.

In a preferred embodiment, the housing has a base plate portion supporting the inflator thereon and a support plate portion extending in a bent form from the base plate portion, the cover has a cover plate portion and a mounting plate portion extending from the cover plate portion toward the housing, the convex portions of the cover are arranged on the mounting plate portion, and the engaged portions of the housing are arranged on the support plate portion.

In the air bag system constructed as described above, the positional relationship between the mounting plate portion and the support plate portion is limited by bringing the convex portions and the engaged portions into engagement with each other. The insertion of the connecting members through both the plate portions can therefore be carried out with ease.

Further, the engagement between the convex portions and the engaged portions can improve the strength of the engaged portions. Since the connecting members are inserted through the thick convex portions, it is possible to prevent deformation of the cover, which would otherwise take place in the vicinity of positions where the connecting members are inserted, owing to the thickening of the cover. The cover has therefore been improved in strength around the connecting members. In addition, the mounting plate portion and the support plate portion can be prevented from displacement in the direction of planes in which the plate portions lie, respectively. It is therefore possible to secure sufficient connecting force for these plate portions without wastefully increasing the number of connecting members.

Moreover, the connecting members extend through the corresponding convex portions so that the engagement between the convex portions and the corresponding engaged portions will not be released even if such a holding strip as that employed in the above-described conventional structure is omitted. It is therefore possible to reduce the number of parts, thereby simplifying the fabrication and control of parts and also the assembly work.

DETAILED DESCRIPTION OF THE INVENTION AND PREFERRED EMBODIMENTS

Figure 1:
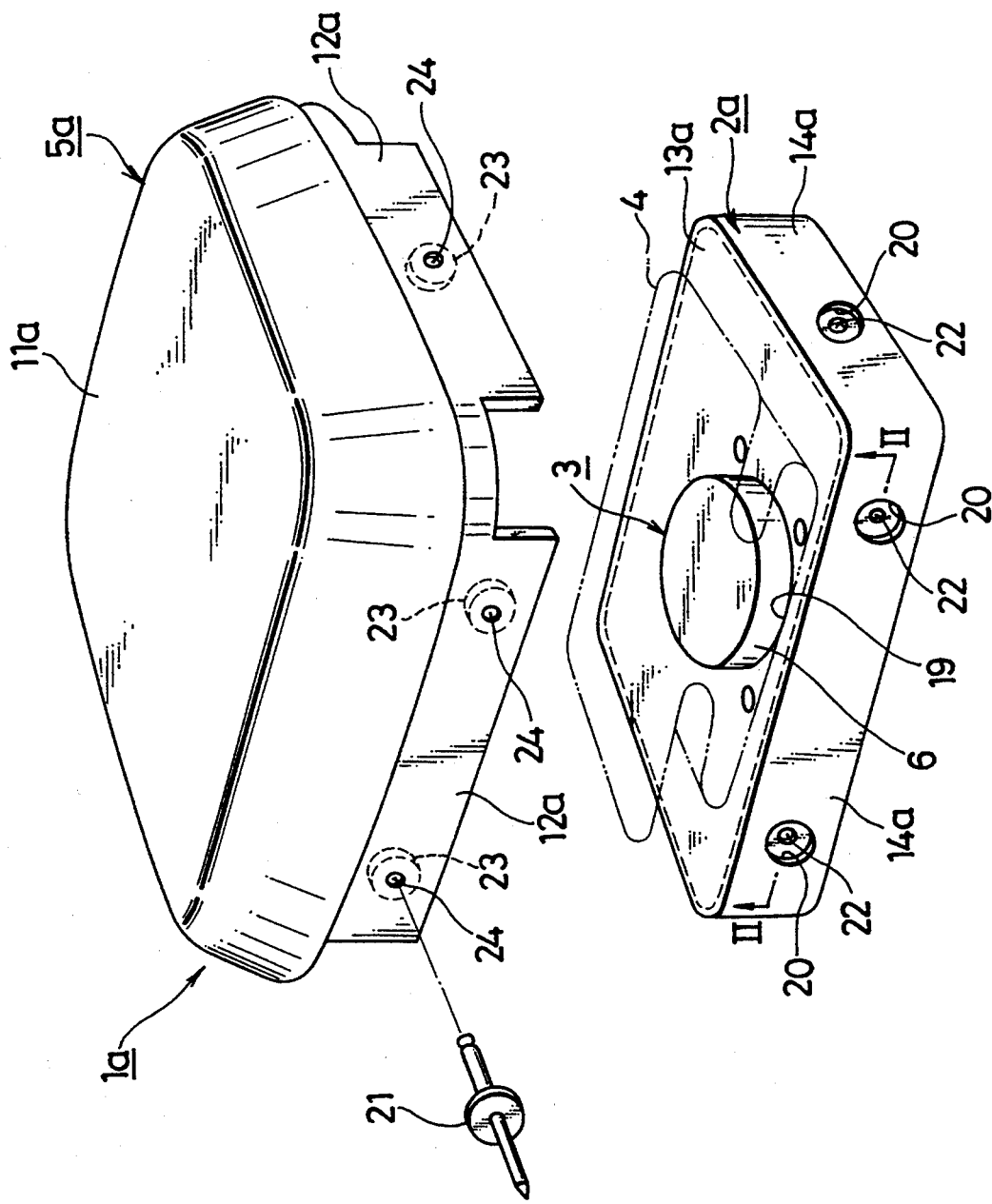
FIG. 1 is an exploded perspective view of an air bag system according to a first embodiment of the present invention.
Figure 2:
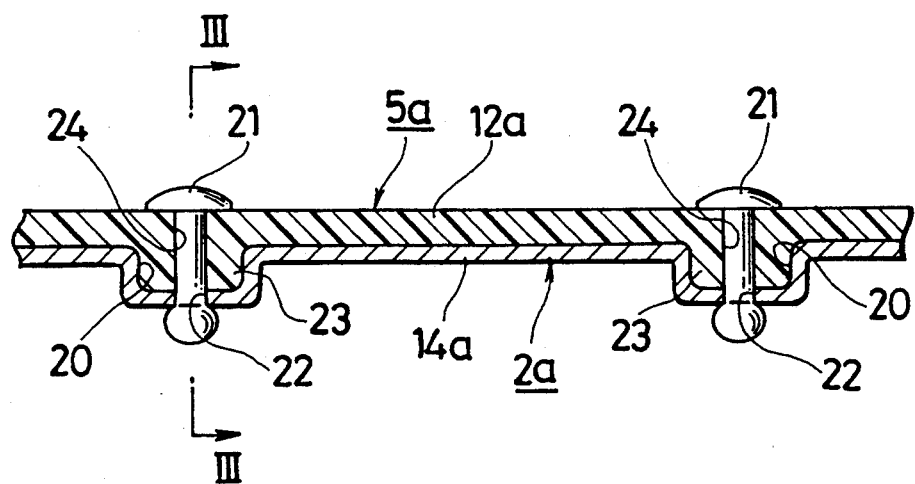
FIG. 2 is a cross-sectional view taken in the direction of arrows II—II of FIG. 1, in which a cover and a housing have been assembled together.
Figure 3:
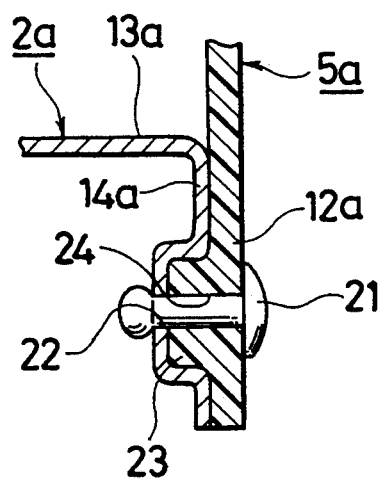
FIG. 3 is a cross-sectional view taken in the direction of arrows III—III of FIG. 2.

Referring to FIGS. 1 through 3, the first embodiment of the present invention will be described. Similarly to the conventional construction described above, an air bag module 1a has a housing 2a is supported and fixed on an unillustrated steering wheel which is in turn secured on a read end portion of a steering shaft (not shown). Fixedly supported in a central part of the housing 2a is an inflator 3 which blows out high-pressure gas such as nitrogen gas upon occurrence of a collision accident. An air bag 4 is supported in a folded form on the housing 2a in such a way that the air bag 4 surrounds a gas blow-out portion 6 of the inflator 3. In the event of the collision accident, the air bag 4 is inflated by the above high-pressure gas.

The housing 2a has been formed, for example, by press-forming a metal plate having sufficient rigidity, and is formed of a rectangular base plate portion 13a and support plate portions 14a extending at approximately a right angle in the same direction from four sides of the base plate portion 13a. Of these plate portions, the base plate portion 13a centrally defines a circular opening 19 in which the gas blow-out portion 6 of the inflator 3 can be inserted freely.

One or two circular recesses 20 are formed as engaged portions in an outer wall of each support plate portion 14a. Each circular recess 20 was formed when the housing 2a was formed by press-forming as described above. A circular hole 22 is centrally defined in each circular recess 20 which was also formed when the metal plate was press-formed. Through each circular hole 22, a blind rivet 21 can be inserted as a connecting member.

On the other hand, a cover 5a which has been formed by injection-molding a synthetic resin extends over, that is, covers the air bag 4 in the folded form. On one side (i.e., the lower side as viewed in FIG. 1) of a cover plate portion 11a extending over the air bag 4, the cover 5a has mounting plate portions 12a which can be connected and fixed to the corresponding support plate portions 14a. These mounting plate portions 12a are thickened at portions thereof so that circular protuberances 23 are formed as convex portions on their inner walls. Each circular protuberance 23 has such dimensions that it can be fitted in the corresponding circular recess 20 without a play or clearance. Further, each circular protuberance 23 centrally defines a circular hole 24 through which its corresponding blind rivet 21 can be inserted.

To connect and fix the cover 5a, which has been constructed as described above, to the housing 2a also constructed as described above, the mounting plate portions 12a are positioned outside the corresponding support plate portions 14a and as illustrated in FIGS. 2 and 3, the circular protuberances 23 are fitted in their corresponding circular recesses 20. As the circular holes 22 and their corresponding circular holes 24 have been registered with each other in the above-assembled state, each blind rivet 21 is inserted through each circular hole 22 and its corresponding circular hole 24. As is illustrated in FIGS. 2 and 3, the mounting plate portions 12a are connected and fixed to the corresponding support plate portions 14a by the blind rivets 21.

In the even of a collision accident, the air bag system according to this invention, which has been obtained by assembling the individual members constructed as described above, inflates the air bag 4 and supports the body of a driver in the same manner as the above-described conventional air bag system. In the case of the air bag system of this invention, in particular, all the above-described conditions (1) to (3) can be satisfied because the air bag system functions as will be described next.

(1) Upon connection of the cover 5a to the housing 2a, the positional relationship between each mounting plate portion 12a and its corresponding support plate portion 14a is limited by bringing each circular protuberance 23 into engagement with its corresponding circular recess 20 as an engaged portion. The blind rivets 21 can be easily inserted, as connecting members, through both the plate members 12a,14a.

(2) By fitting each circular protuberance 23 into its corresponding circular recess 20, the connected parts of the cover 5a to the housing 2a can be improved in strength. Because each blind rivet 21 extends through its corresponding thick circular protuberance 23, it is possible to prevent deformation of the cover around the position where the blind rivet 21 extends. In addition, the fitted engagement between each circular protuberance 23 and its corresponding circular recess 20 can also prevent each mounting plate portion 12a and its associated support plate portion 14a from displacement in the direction of planes in which they lie. It is therefore possible to provide both the plate portions 12a,14a with sufficient connecting strength without the need for a wasteful increase in the number of blind rivets 21.

Figure 12:
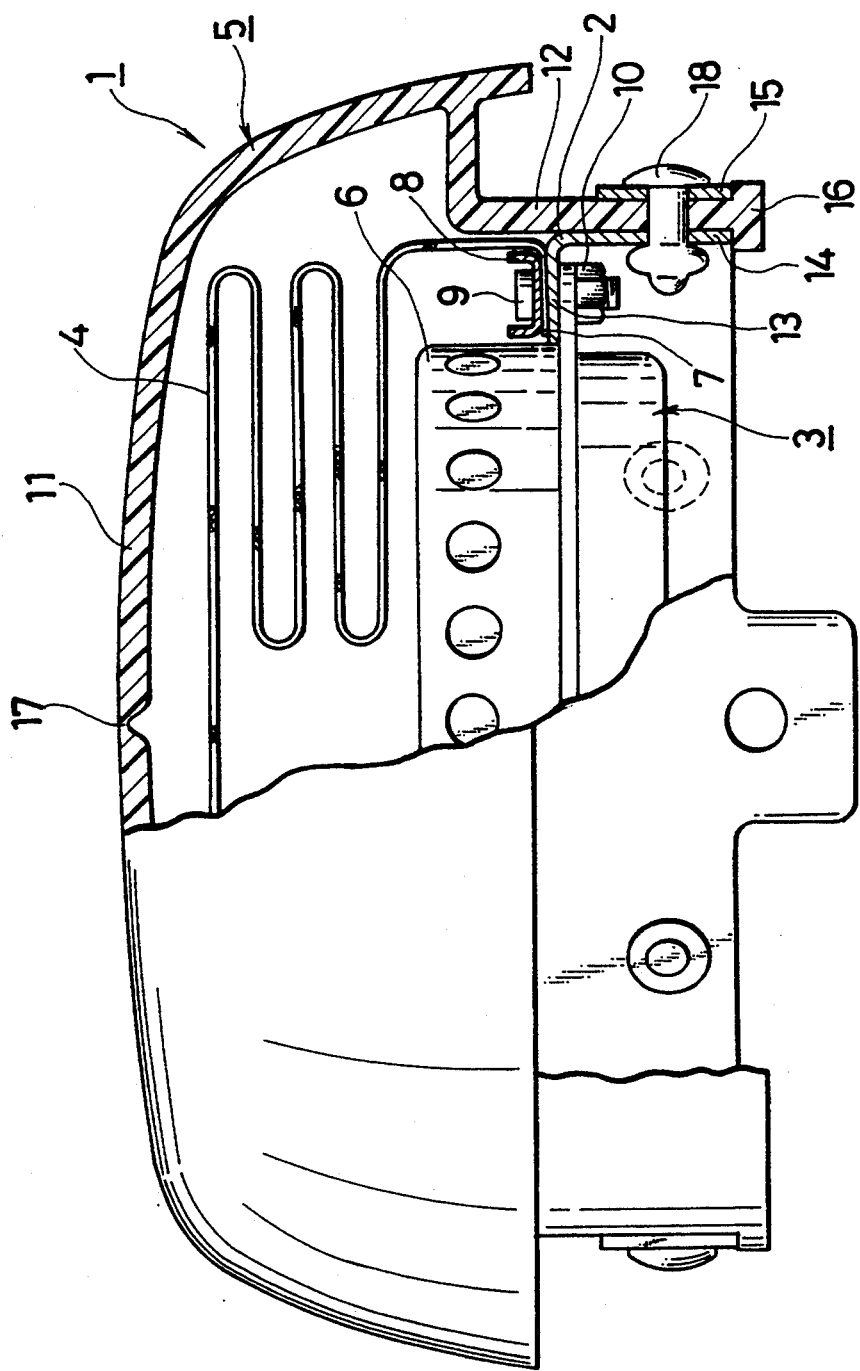
FIG. 12 is a cross-sectional view illustrating one example of conventional structures.

(3) As each blind rivet 21 extends through the circular hole 24 formed centrally in the corresponding circular protuberance 23, the engagement between the circular protuberance 23 and its corresponding circular recess 20 is not released even if the holding strip needed in the above-described conventional structure (see FIG. 12) is omitted. It is therefore possible to reduce the number of parts.

Figure 4:
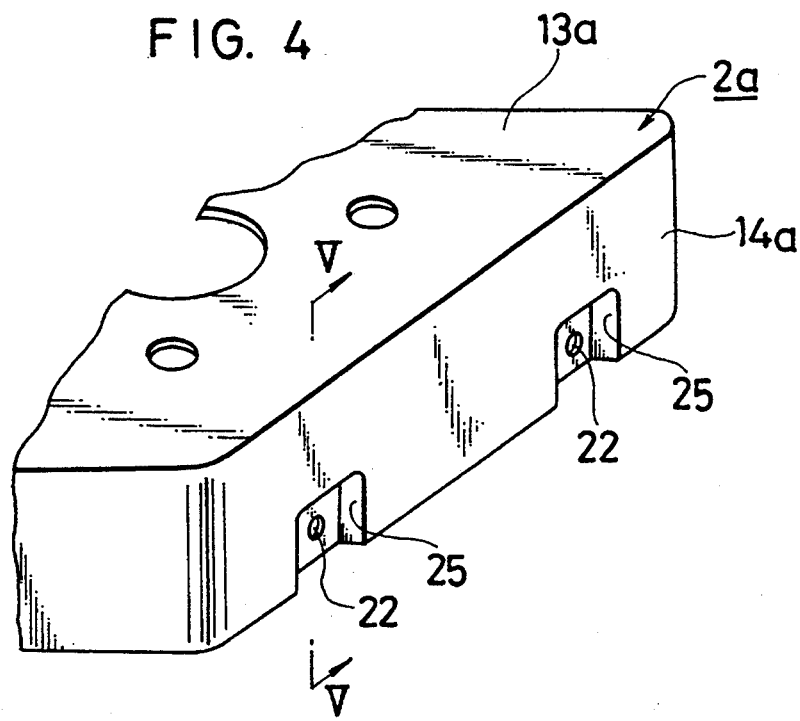
FIG. 4 is a fragmentary perspective view of a housing, illustrating a second embodiment of the present invention.
Figure 5:
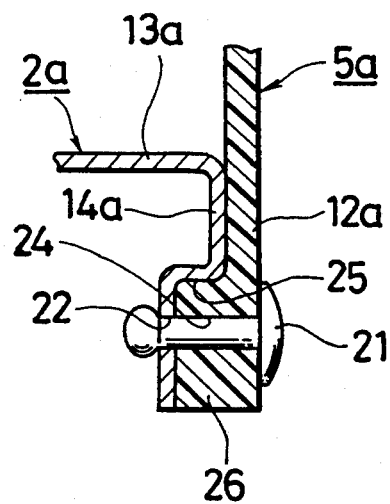
FIG. 5 is a cross-sectional view taken in the direction of arrows V—V of FIG. 4, in which a cover and the housing have been assembled together.

Next, FIGS. 4 to 5 illustrates the second embodiment of the present invention. In this embodiment, each support plate portion 14a forming a housing 2a is provided in a lower half portion thereof with U-shaped recesses 25 which is open at a lower end edge of the support plate portion 14a. On the other hand, each mounting plate portion 12a forming a cover 5a is provided on an inner wall of a lower end portion thereof with U-shaped protuberances 26 which can be fitted in the respective U-shaped recesses 25 without a play or clearance.

To connect and fix the cover 5a, which has been constructed as described above, to the housing 2a also constructed as described above, the mounting plate portions 12a are positioned outside the corresponding support plate portions 14a and as illustrated in FIG. 5, the U-shaped protuberances 26 are fitted in their corresponding U-shaped recesses 25. As circular holes 22 formed in the respective U-shaped recesses 25 and their corresponding circular holes 24 formed in the U-shaped protuberances 26 have been registered with each other in the above-assembled state, each blind rivet 21 is inserted through each circular hole 22 and its corresponding circular hole 24. As is illustrated in FIG. 5, the mounting plate portions 12a are connected and fixed to the corresponding support plate portions 14a by the blind rivets 21. In the second embodiment, the height of the support plate portions 14a can be set shorter compared with the first embodiment. The second embodiment is similar in other construction and advantages to the first embodiment described above.

Figure 6:
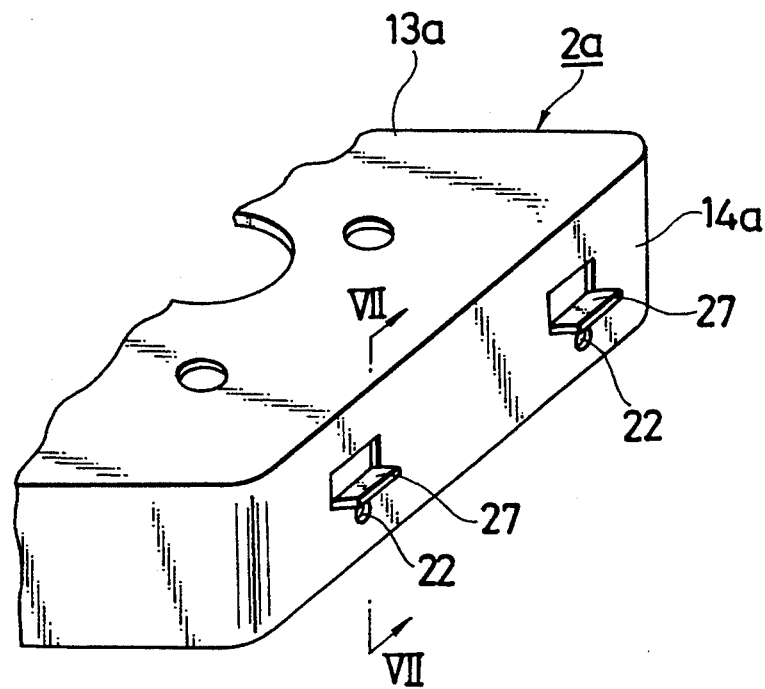
FIG. 6 is a fragmentary perspective view of a housing, showing a third embodiment of the present invention.

The third embodiment of the present invention will next be described with reference to FIGS. 6 to 7. In the third embodiment, each support plate portion 14a forming a housing 2a is provided in an intermediate portion thereof with two sets of inverted square U-shaped slits which are open on a side of a base plate portion 13a. The inside of each slit is lanced, in other words, bent down outwardly at a right angle, thereby forming a bent-down plate portion 27 which functions as an engaged portion. On the other hand, each mounting plate portion 12a forming a cover 5a is provided on an inner wall of a lower end portion thereof with protuberances 28. Circular holes 24 are formed through the respective protuberances 28. Further, each support plate portion 14a defines circular holes 22 at positions adjacent to the respective bent-down plate portions 27 so that when the housing 2a and the cover 5a are assembled, the circular holes 24 are registered with the corresponding protuberances 28. On each protuberance 28, an oblique surface 30 is formed in continuation with a lower edge of the corresponding mounting plate portion 12a. This oblique surface 30 is to facilitate riding of the protuberance 28 over the corresponding bent-down plate portion 27 upon assembly of the cover 5a on the housing 2a.

Figure 7:
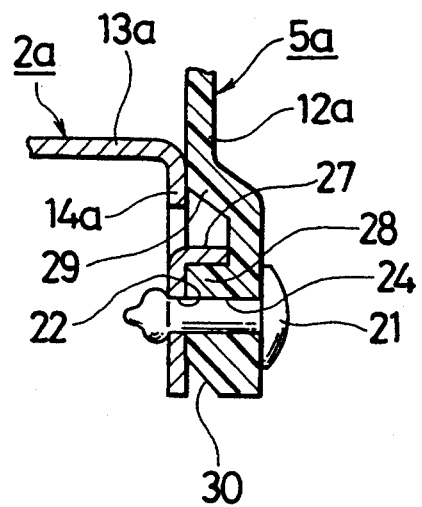
FIG. 7 is a cross-sectional view taken in the direction of arrows VII—VII of FIG. 6, in which a cover and the housing have been assembled together.

To connect and fix the cover 5a, which has been constructed as described above, to the housing 2a also constructed as described above, the mounting plate portions 12a are positioned outside the corresponding support plate portions 14a and as illustrated in FIG. 7, each bent-down plate portion 27 is brought into contact with an upper surface of its corresponding protuberance 28. As the circular holes 22 and their corresponding circular holes 24 formed in the respective protuberances 28 have been registered with each other in the above-assembled state, each blind rivet 21 is inserted through each circular hole 22 and its corresponding circular hole 24. As is illustrated in FIG. 7, the mounting plate portions 12a are connected and fixed to the corresponding support plate portions 14a by the blind rivets 21.

The four mounting plate portions 12a and the four support plate portions 14a are arranged in the form of a rectangular cylinder. Once the bent-down plate portions 27 are brought into the upper surfaces of the corresponding protuberances 28, the positional relationship between the circular holes 22 and their corresponding circular holes 24 is limited not only in a vertical direction but also in a horizontal direction (namely, in a direction perpendicular to the drawing sheet of FIG. 7). In the third embodiment, a bent portion 29 is also formed at an intermediate portion of each mounting plate portion 12a, whereby an inner wall of a portion of the mounting plate 12a is maintained in contact with an outer wall of a portion of the corresponding support plate portion 14a. It is however to be noted that this bent portion 29 or the like is not essential from the standpoint of securement of sufficient connecting strength for the cover 5a and the housing 2a. In the third embodiment, the machining (i.e., pressing) of the housing 2a is easier compared with the first and second embodiments described above. The third embodiment is similar in other construction and advantages to the first and second embodiments.

Figure 8:
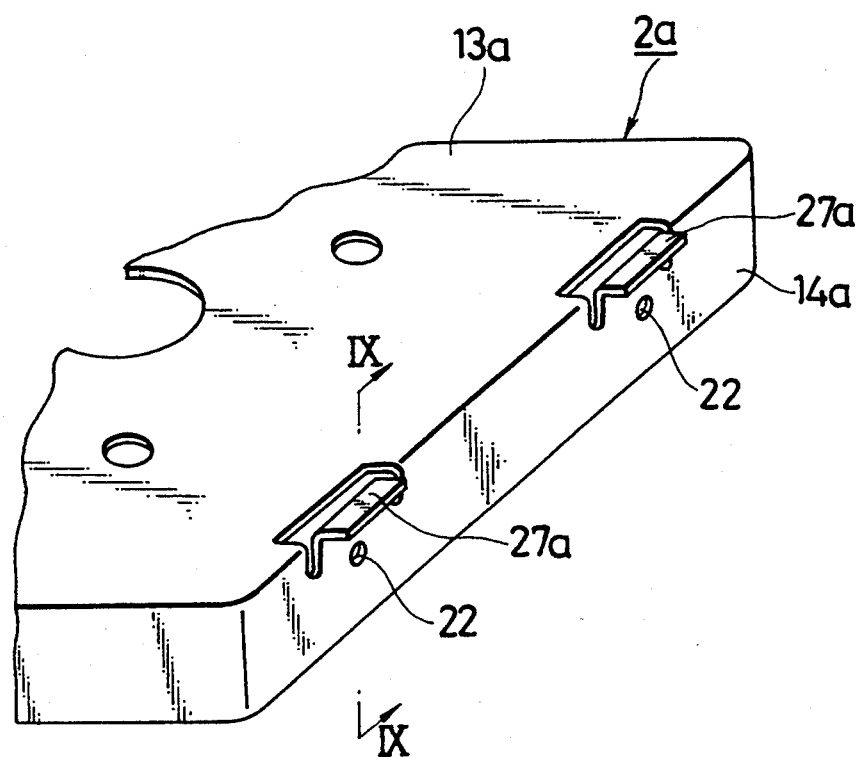
FIG. 8 is a fragmentary perspective view of a housing, depicting a fourth embodiment of the present invention.
Figure 9:
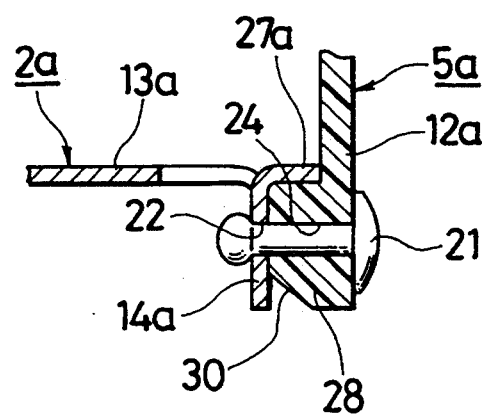
FIG. 9 is a cross-sectional view taken in the direction of arrows IX—IX of FIG. 8, in which a cover and the housing have been assembled together.

Reference is next had to FIGS. 8 to 9 which illustrate the fourth embodiment of the present invention. In the fourth embodiment, portions of a base plate portion 14a of a housing 2a are lanced, i.e., bent over 180° (degrees) so that bent-out plate portions 27a are formed extending outwardly from a corresponding support plate portion 14a. A corresponding mounting plate portion 12a of a cover 5a, on the other hand, is not provided with bent portions similar to the bent portions 29 in the third embodiment. The fourth embodiment can reduce the height of the support plate portion 14a compared with the third embodiment described above. The fourth embodiment is similar in other construction and advantages to the third embodiment.

Figure 10:
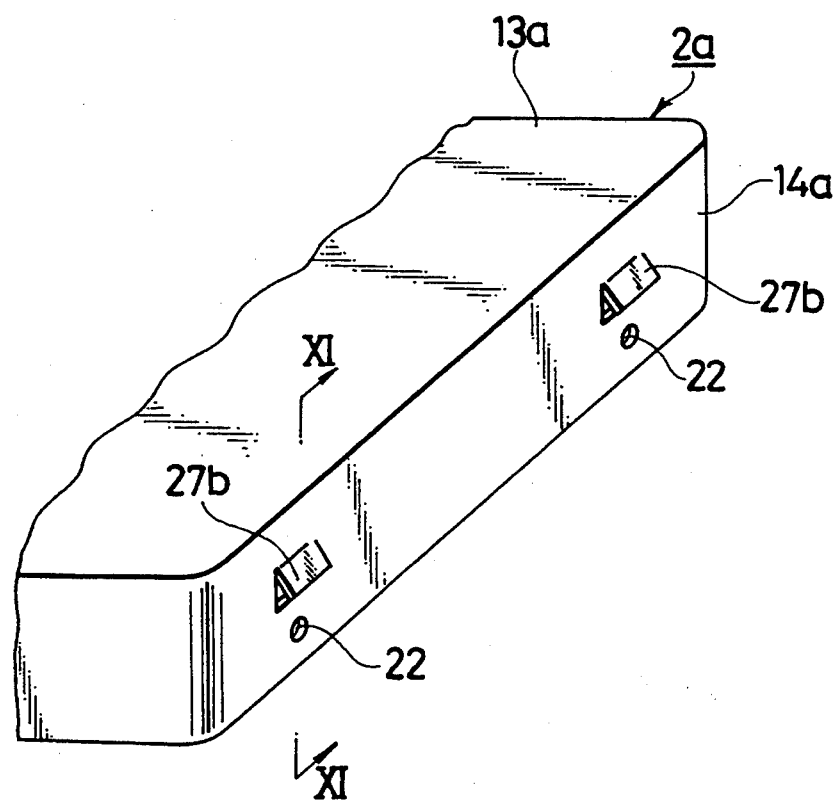
FIG. 10 is a fragmentary perspective view of a housing, illustrating a fifth embodiment of the present invention.
Figure 11:
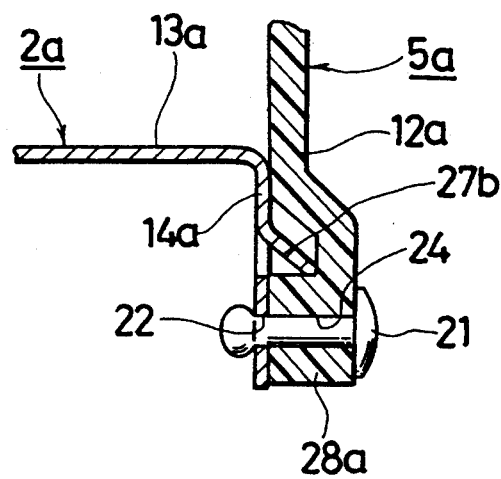
FIG. 11 is a cross-sectional view taken in the direction of arrows XI—XI of FIG. 10, in which a cover and the housing have been assembled together.

Next, FIGS. 10 to 11 illustrates the fifth embodiment of the present invention. In the fifth embodiment, each support plate portion 14a forming a housing 2a is provided at an intermediate portion thereof with two sets of square U-shaped slits which are open on a side of a lower end edge of the support plate portion 14a. The inside of each slit is lanced, in other words, bent up a little outwardly (for example, at 45° or so), thereby forming a bent-up plate portion 27b which functions as an engaged portion. By engagement between lower end edges of the bent-up plate portions 27b of each support plate portion 14a and corresponding protuberances 28a formed on an inner wall of lower end portions of the corresponding mounting plate portion 12a, the support plate portion 14a and its corresponding mounting plate portion 12 are easily connected together.

In the fifth embodiment, each bent-up plate portion 27b is formed aslant so that the corresponding protuberance 28a can easily ride over the bent-up plate portion 27b. Thus, the proturburence 28a is not provided with an oblique surface similar to the oblique surface 30 (see FIGS. 7 and 9). The fifth embodiment is similar in other construction and advantages to the third embodiment described above.

What is claimed is:

1. An air bag system comprising:
   a housing;
   an inflator for blowing out high-pressure gas upon occurrence of a collision accident, said inflator being supported on said housing;
   an air bag for being inflated by said high-pressure gas in the event of said collision accident, said air bag being supported in a folded form on said housing;
   a cover extending over said air bag which is in the folded form; and
   means for connecting and fixing said cover to said housing, said connecting and fixing means having convex portions formed on an inner wall of said cover by inwardly thickening portions of said cover, engaged portions formed on an outer wall of said housing and maintained in engagement with respective ones of said convex portions, and connecting members extending through said respective convex portions with said engaged portions maintained in engagement with said respective convex portions.

2. An air bag system according to claim 1, wherein said housing has a base plate portion supporting said inflator thereon and a support plate portion extending in a bent form from said base plate portion, said cover has a cover plate portion and a mounting plate portion extending from said cover plate portion toward said housing, said convex portions of said cover are arranged on said mounting plate portion, and said engaged portions of said housing are arranged on said support plate portion.

3. An air bag system according to claim 2, wherein said convex portions of said cover have a circular cross-section when viewed in a plane parallel to said mounting plate portion, and said engaged portions of said housing are recesses having a complementary circular shape so that said convex portions are fitted in said engaged portions of said housing.

4. An air bag system according to claim 2, wherein said engaged portions of said housing are U-shaped recesses opening on a side opposite to a side on which said cover plate portion of said cover is located, and said convex portions of said cover are complementary U-shaped protuberances fitted in said respective U-shaped recesses.

5. An air bag system according to claim 2, wherein said engaged portions of said housing are bent-down plate portions formed by slitting and lancing portions of said support plate portion with openings formed on a side of said base plate portion relative to said bent-down plate portions, and said convex portions of said cover are on a side of said cover plate portion in engagement with respective ones of said bent-down portions.

6. An air bag system according to claim 5, wherein each of said convex portions of said cover has, on a side of an end edge of said cover, an oblique surface extending aslant relative to said support plate portion of said housing so that the engagement of said convex portion and a corresponding bent-down portion is facilitated upon assembly of said air bag system.

7. An air bag system according to claim 2, wherein said support plate of said housing is bent at approximately a right angle relative to said base plate portion toward a side opposite to a side on which said air bag is located, said engaged portions of said housing are bent-out plate portions formed by slitting and lancing portions of said support plate portion over approximately 180° so that said bent-out plate portions extend outwardly beyond said support plate portion with openings formed on a side of said base plate portion relative to said bent-out plate portions, and said convex portions of said cover are on a side of said cover plate portion in engagement with said respective bent-out plate portions.

8. An air bag system according to claim 2, wherein said engaged portions of said housing are bent-up plate portions formed by slitting and lancing portions of said support plate portion with openings formed on a side opposite to a side on which said cover plate portion of said cover is located, and said convex portions of said cover are on a side of said cover plate portion in engagement with said respective bent-up portions.

9. An air bag system according to claim 8, wherein said bent-up portions are bent at a predetermined angle relative to said support plate portion.

\* \* \* \* \*